United States Patent [19]

Pekala

[11] Patent Number: 5,476,878
[45] Date of Patent: Dec. 19, 1995

[54] ORGANIC AEROGELS FROM THE SOL-GEL POLYMERIZATION OF PHENOLIC-FURFURAL MIXTURES

[75] Inventor: Richard W. Pekala, Pleasant Hill, Calif.

[73] Assignee: Regents of the University of California, Oakland, Calif.

[21] Appl. No.: 307,219

[22] Filed: Sep. 16, 1994

[51] Int. Cl.⁶ .................................................. C08J 9/28
[52] U.S. Cl. ............................... 521/61; 521/64; 521/181
[58] Field of Search ................................ 521/181, 61, 64

[56] References Cited

U.S. PATENT DOCUMENTS

| | | | |
|---|---|---|---|
| 4,806,290 | 2/1989 | Hopper et al. | 264/28 |
| 4,873,218 | 10/1989 | Pekala | 502/418 |
| 4,997,804 | 3/1991 | Pekala | 502/418 |
| 5,086,085 | 2/1992 | Pekala | 521/187 |
| 5,252,620 | 10/1993 | Elliott, Jr. et al. | 521/149 |
| 5,260,855 | 11/1993 | Kaschmitter et al. | 361/502 |

*Primary Examiner*—Morton Foelak
*Attorney, Agent, or Firm*—Henry P. Sartorio; L. E. Carnahan

[57] ABSTRACT

The sol-gel polymerization of a phenolic-furfural mixture in dilute solution leads to a highly cross-linked network that can be supercritically dried to form a high surface area foam. These porous materials have cell/pore sizes $\leq 1000$Å, and although they are dark brown in color, they can be classified as a new type of aerogel. The phenolic-furfural aerogel can be pyrolyzed in an inert atmosphere at 1050° C. to produce carbon aerogels. This new aerogel may be used for thermal insulation, chromatographic packing, water filtration, ion-exchange, and carbon electrodes for energy storage devices, such as batteries and double-layer capacitors.

14 Claims, 5 Drawing Sheets

ORGANIC AEROGELS FROM THE SOL-GEL POLYMERIZATION OF PHENOLIC-FURFURAL MIXTURES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to organic aerogels, particularly to carbon aerogels, and more particular to a phenolic-furfural aerogels and to methods of preparing same.

Aerogels are a unique class of ultra fine cell size, low density, open-cell foams. Aerogels have continuous porosity and a microstructure composed of interconnected colloidal-like particles or polymeric chains with characteristic diameters of 100 angstroms. The microstructure imparts high surface areas to aerogels, for example, from about 350 $m^2/g$ to about 1000 $m^2/g$.

Organic aerogels from the sol-gel polymerization of resorcinolformaldehyde have been developed, as disclosed in U.S. Pat. No. 4,873,218 issued Oct. 10, 1989 and U.S. Pat. No. 4,997,804 issued Mar. 5, 1991 to R. W. Pekala. Also, organic aerogels from the aqueous, sol-gel polymerization of melamine with formaldehyde has been developed as disclosed in U.S. Pat. No. 5,086,085 issued Feb. 4, 1992 to R. W. Pekala.

Carbon aerogels are formed by pyrolyzing resorcinol-formaldehyde aerogels, for example, in an inert atmosphere, and the carbon aerogels may be doped or impregnated with selected materials to increase the electrical conductivity thereof, and provide improved properties over prior developed microcellular carbon form, exemplified by U.S. Pat. No. 4,806,290 issued Feb. 21, 1989 to R. W. Hopper et al.

More recently, carbon aerogel electrodes have been derived from the pyrolysis of resorcinol-formaldehyde and related polymers, which are of intermediate to high density (0.1 to 1.2 g/cc) electrically conductive and have high surface areas (400 to 1000 $m^2/g$), and have particular application in energy storage devices, such as double layer capacitors, known as supercapacitors, having capacitances on the order of several tens of farad per gram of electrode. Such carbon foam electrodes are disclosed in U.S. Pat. No. 5,260,855 issued Nov. 9, 1993 to J. L. Kaschmitter et al.

The various prior method of forming the organic aerogels have utilized critical point or supercritical drying procedures, as disclosed in the above-referenced U.S. Patents, and in U.S. Pat. No. 5,252,620 issued Oct. 12, 1993 to J. R. Elliott, Jr. et al. Recently, a new air drying technique has been developed, which is substantially less expensive and less time consuming then the supercritical drying techniques, and is described and claimed in copending U.S. application Ser. No. 08/041,503 filed Apr. 1, 1993, entitled "Method Of Low Pressure And/Or Evaporated Drying Of Aerogel".

Organic aerogels such as resorcinol-formaldehyde (RF) and melamine-formaldehyde (MF) have low thermal conductivities as a result of their ultra fine cell size and low densities. The RF and MF aerogels are formed from a sol-gel polymerization in water, followed by a solvent exchange into acetone, and subsequent supercritical drying from carbon dioxide ($T_c=31°$ C; $P_c=7.4$ MPa), as described in detail in above-referenced U.S. Pat. No. 4,873,218 and U.S. Pat. No. 5,086,085, for example. These aerogels have been utilized in a wide variety of applications, such as thermal insulation and ICF targets. In the case of resorcinol-formaldehyde, for example, the aerogel can be pyrolyzed in an inert atmosphere, such as nitrogen, at 600°–3000° C. to form a carbon aerogel. Carbon aerogels or thin film composites formed from them (i.e. non-woven carbon cloth (paper)+carbon aerogel), as disclosed in above-referenced U.S. Pat. No. 5,260,855, for example, are finding applications as electrodes in double layer capacitors (supercapacitors), and other energy storage devices, as well as in fuel cell and deionization systems.

While the prior aerogels have been shown to have a wide variety of applications, either in the aerogel or the carbon aerogel form, it is desirable to develop new organic aerogels which have different densities, cell sizes, and surface areas which can be utilized in the same or in different applications, such as chromatographic packings, water filtration, and ion-exchange, for example. The present invention provides a new type of organic aerogel, a phenolic-furfural aerogel, developed from the reaction of phenolic novolak with furfural, which can also be pyrolyzed in an inert atmosphere to produce carbon aerogels, which has thermal conductivities as low as 0.015 W/m-K, and thus this invention constitutes an advance in organic aerogels.

SUMMARY OF THE INVENTION

An object of the present invention is to provide a new composition of matter (organic aerogel).

A further object of the invention is to provide a phenolic-furfural aerogel.

A still further object of the invention is to provide a new organic aerogel, which can be pyrolyzed to form a new carbon aerogel.

Another object of the invention is to provide a method for forming a new organic aerogel which involves sol-gel polymerization of phenolic-furfural mixtures.

Another object of the invention is to provide a method for fabricating a new carbon aerogel which involves pyrolysis of a phenolic-furfural aerogel, and which has a density of 0.2–1.0 g/cc, cell/pore sizes $\leq 1000$ angstroms, and surface area of up to about 1000 $m^2/g$.

Another object of the invention is to provide an organic aerogel from the sol-gel polymerization of phenolic-furfural mixtures having the ability to be formed directly in an organic solvent (i.e. alcohol) that is compatible with carbon dioxide, thereby eliminating the need for solvent exchange prior to supercritical drying, and the ability to be pyrolyzed into an electrically conductive, porous carbon with high surface area.

Other objects and advantages will become apparent from the following description. Basically, the present invention comprises a new composition of matter (organic aerogel) from the sol-gel polymerization of phenolic-furfural mixtures, and methods for fabricating same. The new organic aerogel may be carbonized by pyrolyzing in an inert atmosphere to produce a carbon aerogel. The sol-gel polymerization of a phenolic-furfural mixture in dilute solution leads to a highly cross-linked network that can be supercritically dried to form a high surface area foam. These porous materials have cell/pore sizes $\leq 1000$ Å, and although dark in color, can be classified as a new type of aerogel. The phenolic-furfural aerogels can be pyrolyzed in an inert atmosphere at 600°–3000° C.; preferably at 1050° C., to produce carbon aerogels, having a density of about 0.2–1.0 g/cc, for example. The method involved in producing the new aerogel enables such to be formed directly in an organic solvent (e.g. 1-propanol, isopropanol) that is compatible with carbon dioxide ($CO_2$), and subsequent supercritical drying, thus simplifying the prior processes utilized to produce the RF and MF aerogels referenced above. Surface areas of 350–600 $cm^2$/g have been measured, with thermal conductivities as low as 0.015 W/m-K under ambient conditions.

DETAILED DESCRIPTION OF THE INVENTION

Figure 1:
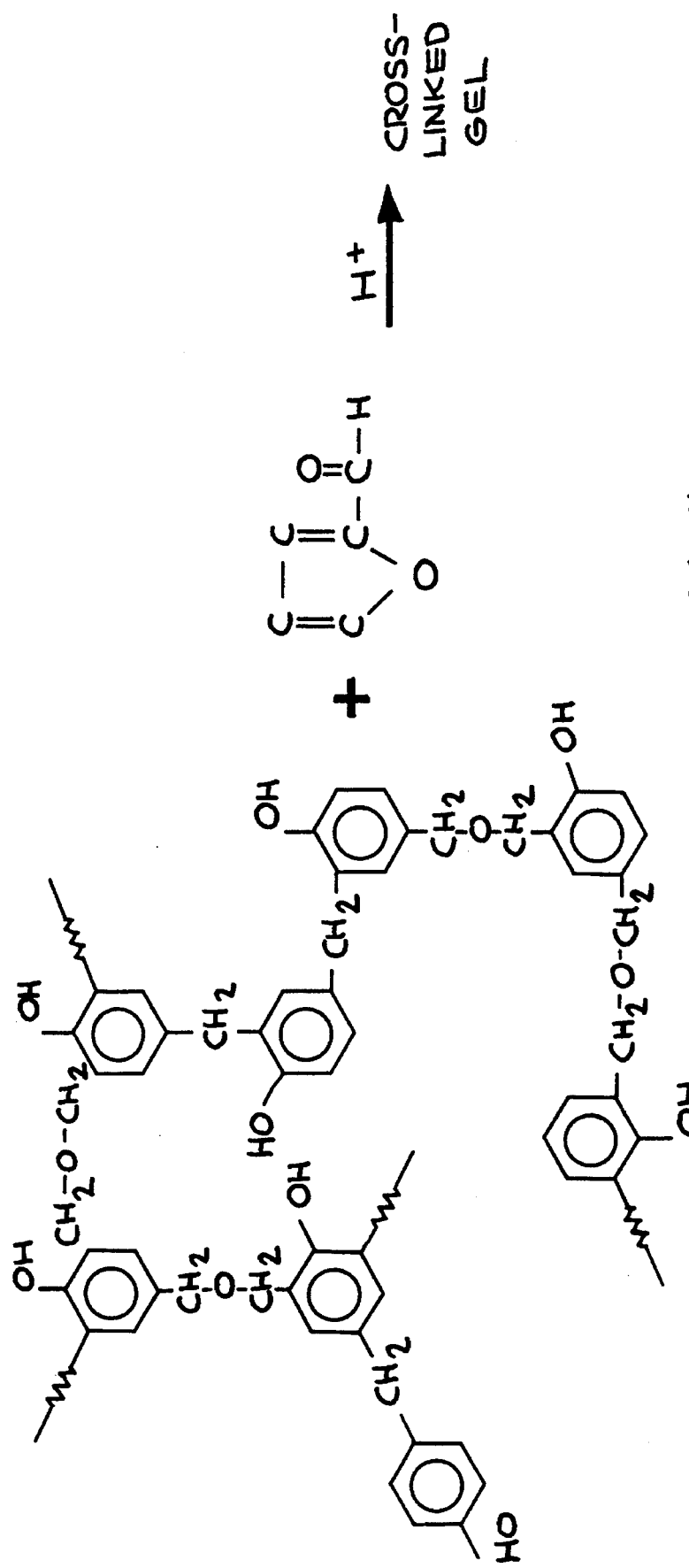
FIG. 1 is a schematic diagram of a phenolic novolak oligomer with furfural in a FurCarb UP520 resin solution.

The present invention involves a new composition of matter (organic aerogel) from the sol-gel polymerization of phenolic-furfural mixtures, and methods for producing same. Like the prior known resorcinol-formaldehyde (RF) organic aerogels, the new phenolic-furfural (PF) aerogels can be pyrolyzed (carbonized) in a selected atmosphere to produce carbon aerogels (carbon foams). The primary difference in the methods for producing the new PF aerogels and the prior methods for producing the RF and MF aerogels is in its simplification by the PF's ability to be formed directly in an organic solvent, such as 1-propanol, that is compatible with carbon dioxide ($CO_2$) and subsequent supercritical drying. Thus, this method eliminates the sol-gel polymerization in water, followed by a solvent exchange into acetone, utilized in the prior known formation processes. As in the case of the RF-derived carbon aerogels or foam, the new PF-derived carbon aerogels (carbon foam) can be utilized alone or as thin composites formed from them (i.e. non-woven carbon cloth or carbon paper plus the carbon aerogel) for use as electrodes, as discussed above.

During verification experiments, the phenolic-furfural (PF) gels were prepared from a commercially available polymer solution composed of approximately a 50:50 mixture of a phenolic novolak resin dissolved in furfural. This solution was diluted with 1-propanol and 10 phr catalyst was added. Solutions prepared with different amounts of diluent were then poured into glass vials, sealed, and cured for seven (7) days at 85° C. A small amount of syneresis was observed during the cure cycle, allowing the gels to be easily removed.

The PF gels are dark in color, making it difficult to evaluate the gel structure via light scattering. After removal from the glass vials, the gels were placed directly into a pressure vessel and the vessel was filled with liquid carbon dioxide which was completely exchanged over several days for the alcohol present in the pores of the PF gels. The pressure vessel was then heated above the critical point of carbon dioxide ($T_c$=31° C.; $P_c$=7.4 MPa). After slowly venting the pressure vessel, the PF gels were removed and further characterized.

These verification experiments established that PF aerogels are composed of a highly cross-linked polymer matrix, and they can be pyrolyzed in an inert atmosphere to produce carbon aerogels. Pyrolysis was conducted in a 3-zone furnace (Lindberg Model #54657-S) under nitrogen flow using the following ramp cycle: 22° C.→250° C. in 2 hrs., held at 250° C. for 4 hrs., 250° C.→1050° C. in 9.5 hrs., and held at 1050° C. for 4 hrs. The furnace was then allowed to cool under its own thermal mass to room temperature in about 16 hrs. The thus produced carbon aerogels were black in color. Pyrolysis leads to volumetric shrinkage of ~70% with an accompanying mass loss of ~45%.

A variety of characterization techniques were used to establish the chemistry-structure-property relationship of the PF aerogels and their carbonized derivatives, including particle size and shape, thermal conductivities, and surface area, as set forth in greater detail hereinafter. Particle size and surface area were evaluated with transmission microscopy and gas adsorption techniques, respectively. The elastic properties of the aerogels were probed with an ultrasonic pulse-echo technique, with one ultrasonic transducer transmitting sound waves, and another acting as a receiver. The acoustic coupling of the transducers to the aerogel specimens was achieved without a coupling agent by applying a small mechanical load. Due to the relatively high acoustic attenuation, only frequencies less than 200 kHz were used. Thermal conductivity measurement were performed using a hot-wire device.

The sol-gel polymerization of phenolic-furfural represents an advance in organic aerogels because of: 1) their new composition, 2) their ability to be formed directly in an organic solvent that is compatible with $CO_2$, and 3) the ability to pyrolyze these materials into an electrically conductive, porous carbon with high surface area. Initial samples have been formed by diluting a phenolic-furfural mixture (i.e. FurCarb UP520, made by QO Chemicals, Inc.) in 1-propanol and polymerizing in the presence of an acid catalyst at 50° C. to 85° C. The acid catalyst may be toluenesulfonic acid, phosphoric acid, or QUACORR 2001 made by QO Chemicals, Inc. A typical formulation would contain: 10 g FurCarb UP520, 20–100 ml n-propanol, and 0.5–1.0 g Q2001 catalyst. FurCarb UP520 is composed of approximately a 50:50 mixture of a phenolic novolak resin dissolved in furfural. After gelation and supercritical extraction, an aerogel with a density of ~0.10–0.5 g/cc results. The thus formed aerogel can be pyrolyzed in various atmospheres at 600°–3000° C., preferably at 1050° C. in the presence of nitrogen to produce a carbon aerogel with a density of 0.2–1.0 g/cc. If desired the aerogels can be formed to include materials which would provide enhanced electrical conductivity, or doped or impregnated with materials to provide a desired end product. For example, the dopant may be platinum, zinc, nickel, or copper powders. The aerogel and/or carbon foam formed from the aerogel can be machined to a desired shape and size.

The fabrication method can be modified by changing the formation of the furfural-phenolic mixtures, the amount and composition of the solvent, and the amount and composition of the catalyst, thereby resulting in PF aerogels having different densities, surface areas, etc.

The sol-gel polymerization of a phenolic novolak with furfural is illustrated in FIG. 1. Cross-linking occurs between aromatic rings through the aldehyde group on furfural. The phenolic novolak is a low molecular weight polymer derived from the acid catalyzed reaction of a molar excess of phenol with formaldehyde. This multifunctional oligomer must be reacted with additional aldehyde, in this case furfural, to form a thermoset resin or cross-linked gel.

Figure 2A:
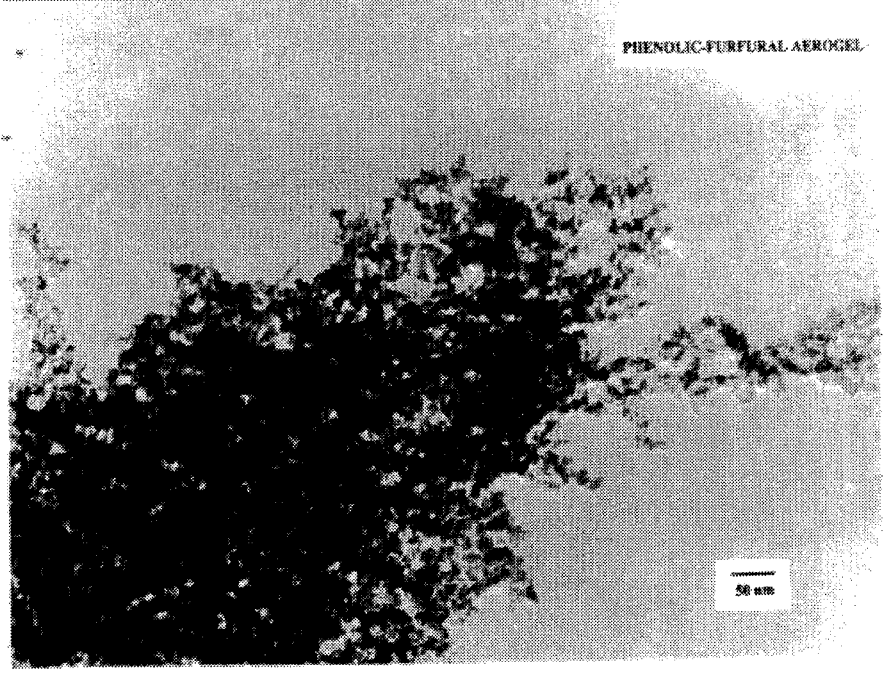
FIGS. 2A and 2B are transmission electron micrographs of a phenolic-furfural (PF) aerogel (FIG. 2A) and its carbonized derivative (FIG. 2B).
Figure 2B:

Transmission electron micrographs (TEMs) of a PF aerogel and its carbonized derivative are shown in FIGS. 2A and 2B. The TEMs reveal interconnected particles with irregular shapes, unlike previous organic aerogels which have distinct spherical particles or interconnected fibers. The characteristic particle size for PF aerogels is approximately 10 nm. During pyrolysis, PF aerogels undergo ~45% mass loss and volumetric shrinkage of ~70%. FIG. 2B reveals that the particle size of the resultant carbon aerogel appears to be slightly larger than its PF precursor. A similar result was obtained from the pyrolysis of resorcinol-formaldehyde aerogels synthesized at resorcinol/catalyst (R/C)=50, whereas a reduction in particle size was observed for aerogels synthesized at higher R/C ratios. The change in particle size upon pyrolysis likely depends upon whether the precursor aerogel has a "polymeric" or "colloidal" structure. BET surface area for the PF aerogels is 385±16 m²/g over a density range of 100–250 kg/m³, while the carbon aerogels exhibit surface areas of 512±40 m²/g over a density range of 300–450 kg/m³. The aerogels in FIGS. 2a and 2b have bulk densities of 156 and 335 kg/m³, respectively.

Figure 3:
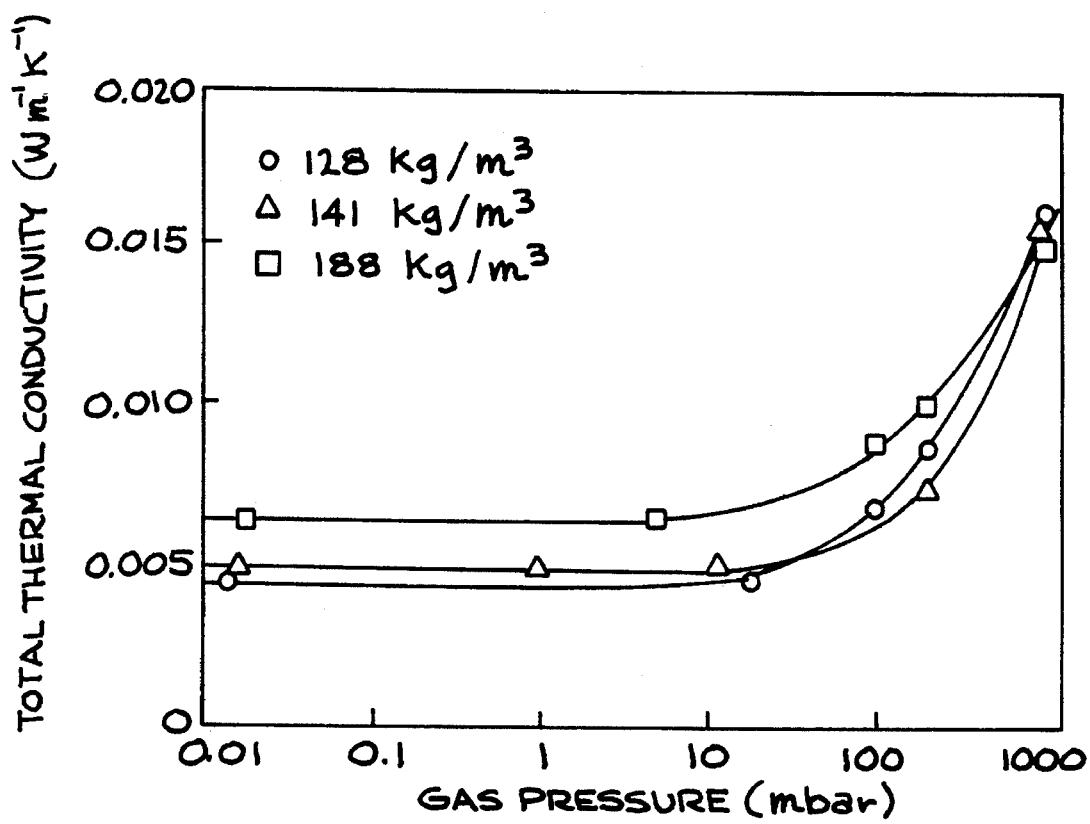
FIG. 3 is a plot showing the variation of total thermal conductivity of PF aerogel monoliths as a function of gas pressure for different bulk densities.

FIG. 3 shows the thermal conductivities of PF aerogels as a function of gas pressure for densities $\rho$=128, 141, and 188 kg/m³. At room temperature, the total thermal conductivities of PF aerogels in air are between 0.015 and 0.017 W/m-K and between 0.0045 and 0.0065 W/m-K after evacuation. The total thermal conductivity in air shows a minimum at a density of about 200 kg/m³, whereas a monotonic increase with density occurs after evacuation. From the difference of the thermal conductivities before and after evacuation, the gaseous conduction $\lambda_g$ is obtained. The gaseous conduction ranges from 0.009 to 0.012 W/m-K, far below the value for non-convecting air (i.e., 0.026 W/m-K) and providing direct evidence that these new porous materials are aerogels. As with other aerogel compositions, $\lambda_g$ becomes negligible below 50 mbar.

Infrared absorption measurements were also performed on PF aerogels. Using Rosseland mean averaging, the temperature dependent specific extinction e(T) was derived. A value of approximately 50 m²/kg was obtained, similar to the value for resorcinol-formaldehyde aerogels. Using this value and subtracting the radiative contribution to the heat transfer, the solid thermal conductivities $\lambda_s$ of PF aerogels are shown as a function of density in FIG. 4. All RF aerogels were prepared at an R/C ratio of 200.

Figure 5:
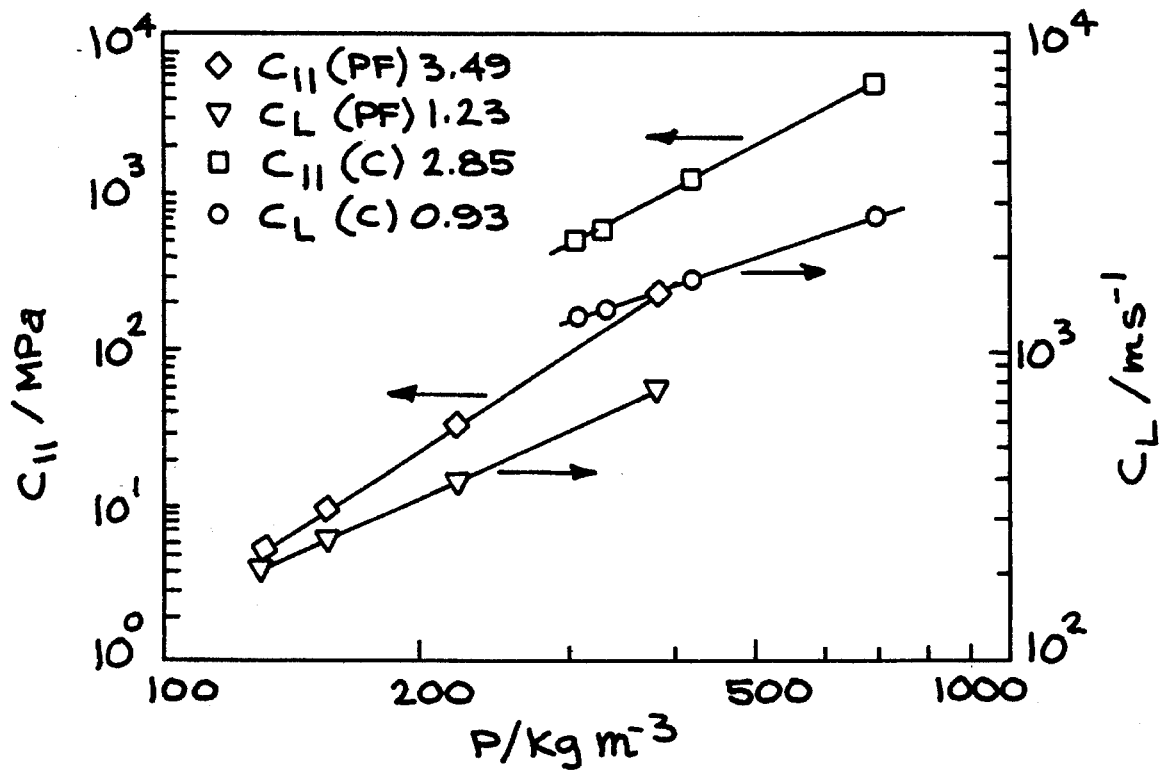
FIG. 5 is a log-log plot of the elastic modulus $C_{11}$ and longitudinal sound velocity $C_L$ for PF aerogels and their carbonized derivatives as a function of their bulk density.

The longitudinal sound velocities CL and elastic constants $C_{11}$ for PF and carbon aerogels as a function of their bulk density are shown in FIG. 5. The inset shows the scaling exponent for these properties with respect to aerogel density.

PF aerogels have two major advantages over previous organic aerogels: (1) the cross-linked gels can be processed more quickly because the solvent exchange step has been eliminated and (2) the starting monomer/oligomer solution is relatively cheap (i.e., $1.80/kg). TEM and BET surface area data for PF aerogels and their carbonized derivatives are similar to other aerogels, except that the interconnected particles have irregular shapes which mimic flat platelets with ~10 nm dimensions in many cases.

Figure 4:
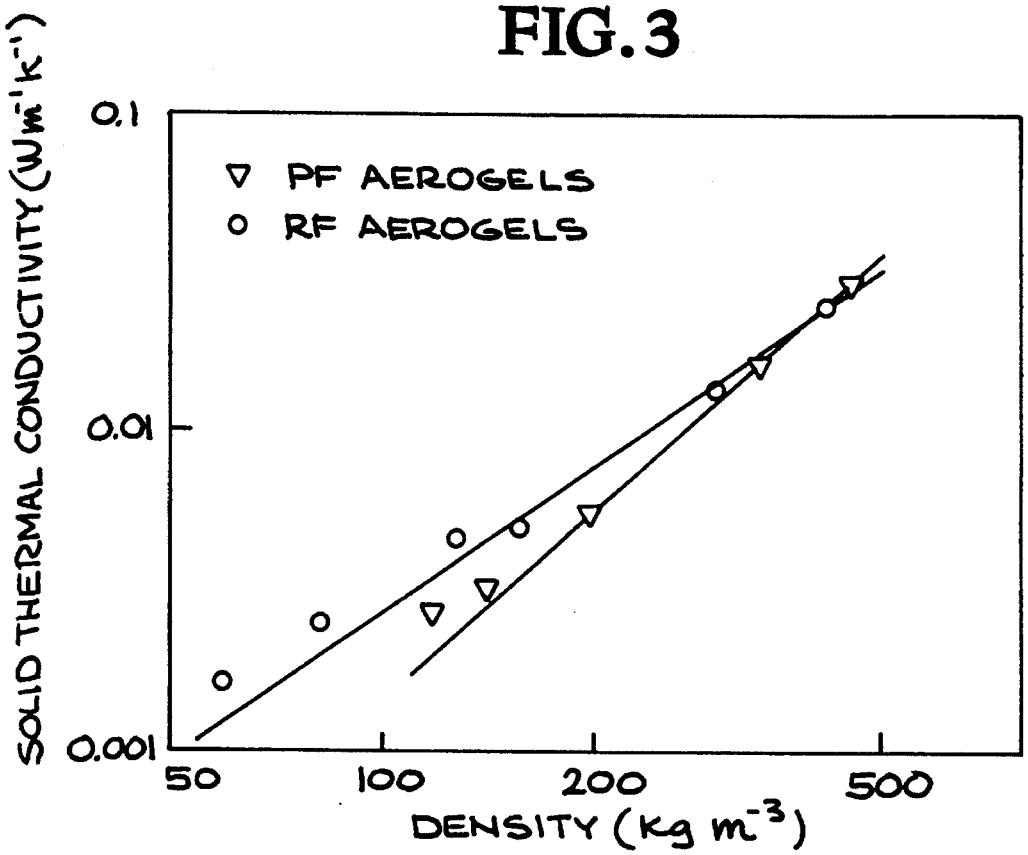
FIG. 4 is a plot of the solid conductivity $\lambda_s$ as a function of bulk density for various PF ($\nabla$) and RF (O) aerogels.
Figure 6:
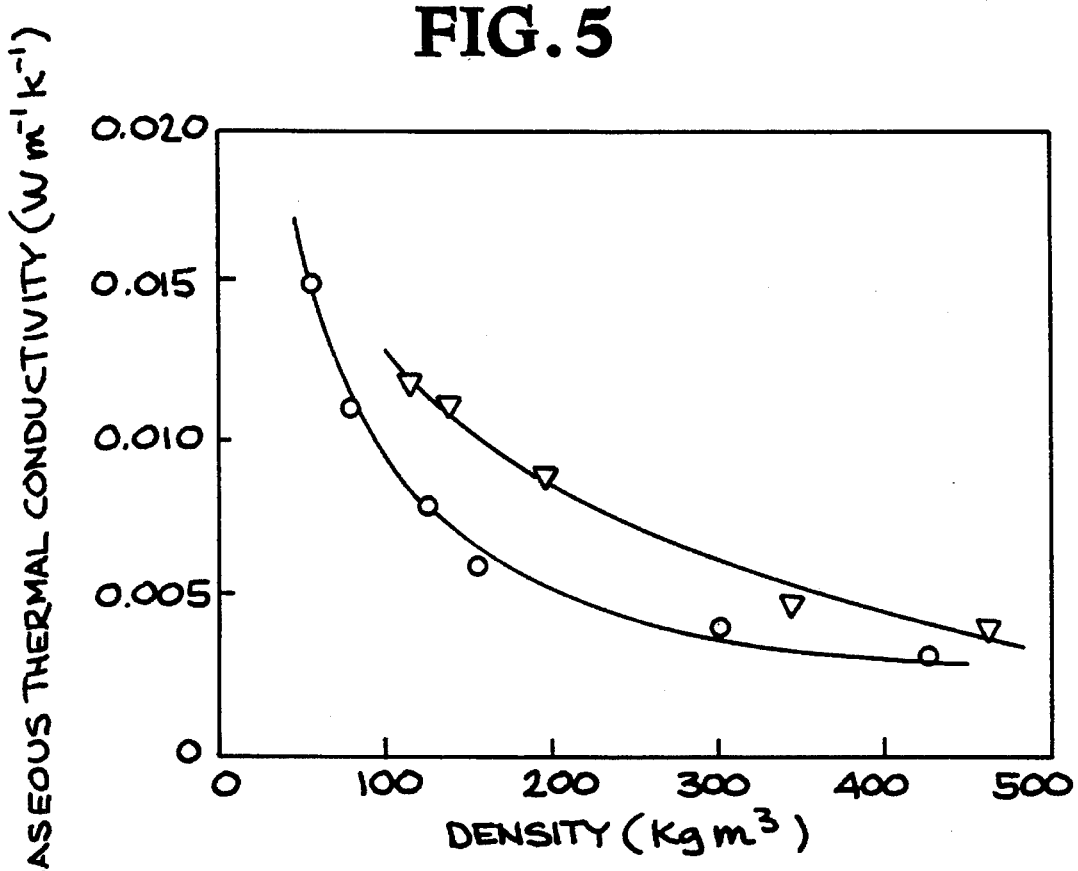
FIG. 6 is a plot of the gaseous conductivity $\lambda_g$ as a function of bulk density for various PF ($\nabla$) and RF (O) aerogels.

In order to be classified as an aerogel, a porous material must have both a solid matrix and pore phase with characteristic dimensions less than 100 nm. The thermal transport through such materials can be described as $$\lambda_{total} = \lambda_s + \lambda_g + \lambda_r \quad [1]$$

where $\lambda_s$ is the solid conductivity, $\lambda_g$ is the gaseous conductivity, and $\lambda_r$ is the radiative contribution. PF aerogels that are 1 cm thick provide enough IR absorption to be considered optically thick. As shown in FIG. 4, the solid conductivity of PF aerogels is $$\lambda_s \propto \rho^a, \text{ where } a=2.0 \quad [2]$$

in the density range 100–500 kg/m³. The scaling exponent for the solid thermal conductivity is larger than the one for resorcinol-formaldehyde aerogels. FIG. 6 shows the gaseous conductivity ($\lambda_g$) at ambient conditions, derived by subtracting the radiative and solid conductivity contributions from $\lambda_{total}$, for PF and RF aerogels as a function of density. The PF aerogels have a larger average pore size than RF aerogels at any given density. Nevertheless, the pore size is still small enough to suppress gaseous conduction and eliminate convection. All RF aerogels were prepared at an R/C ratio of 200.

From acoustic measurements, the elastic constant $C_{11}$ was derived according to $$C_{11} = C_L^2 \rho \quad [3]$$

where CL is the longitudinal sound velocity and $\rho$ is the bulk density. FIG. 5 shows a log-log plot of both the elastic constant and longitudinal sound velocity versus aerogel density. The scaling exponent for the elastic constant of PF aerogels is higher than RF aerogels, whereas the exponents for the carbonized derivatives of each type of aerogel are identical. The higher exponent of the PF aerogels is similar to acid catalyzed silica and melamine-formaldehyde aerogels, and it may indicate similarities in the sol-gel pathway.

Figure 7:
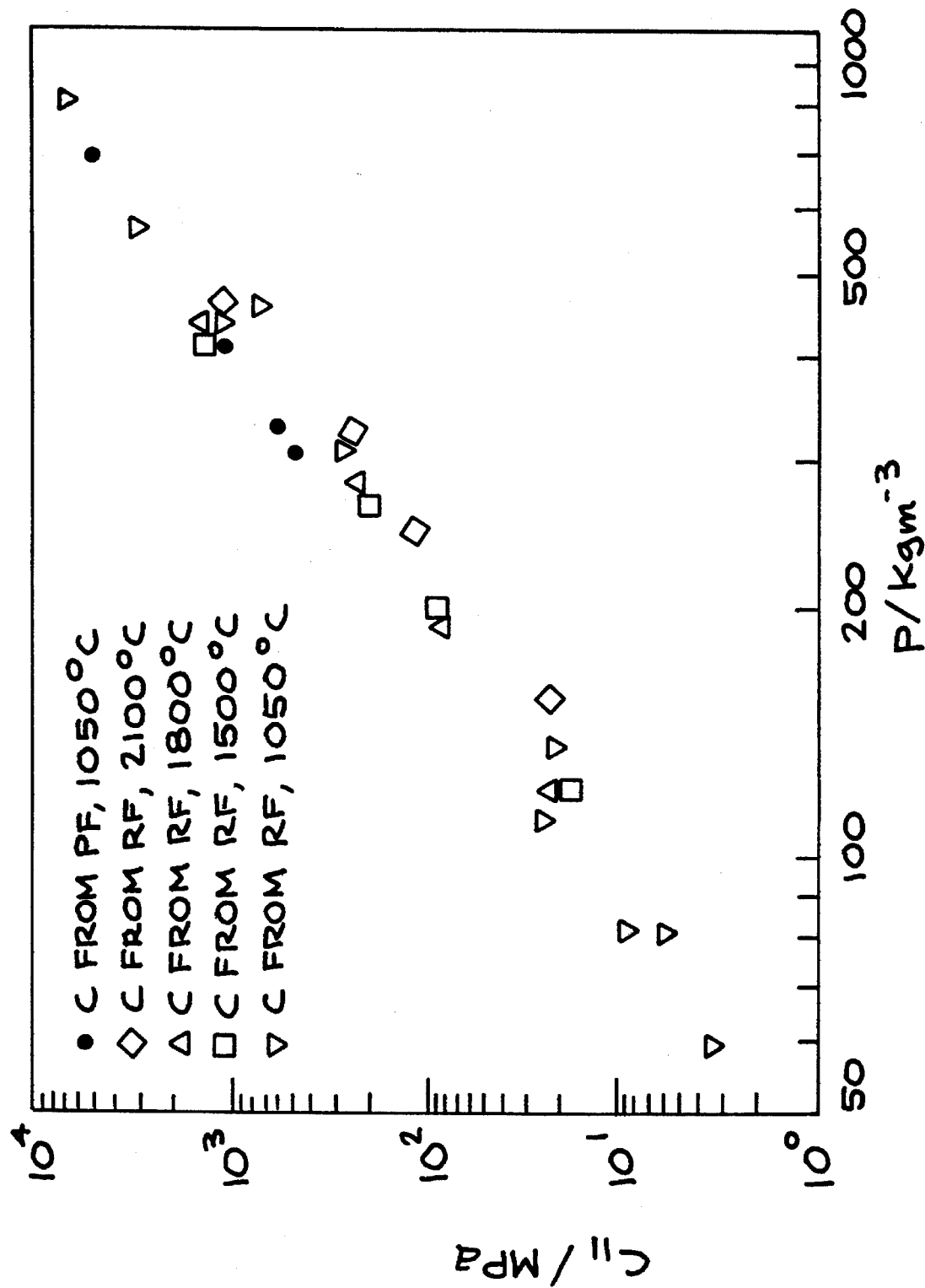
FIG. 7 is a log-log plot of elastic modulus $C_{11}$ for carbon aerogels as a function of their bulk density.

The scaling exponent of the longitudinal sound velocities for both PF and carbon aerogels is similar to other inorganic and organic aerogels. In FIG. 7, the elastic constant for these PF-derived carbon aerogels is compared to a series of samples derived from resorcinol-formaldehyde aerogels. Within the error bars of the data, these PF-derived carbon aerogels are identical to previous carbon aerogels derived from resorcinol-formaldehyde at an R/C ratio of 200. The elastic moduli were determined with an accuracy of approximately 10%. This error is smaller than typical variations of the elastic moduli at a given density. Small structural differences are probably responsible for this variation. The new PF-derived carbon aerogels, however, show elastic moduli that do not systematically deviate from those of RF-derived carbon aerogels. All PF aerogels were pyrolyzed at 1050° C. whereas the RF aerogels were pyrolyzed at 1050, 1500, 1800, and 2100° C.

The following set forth in detail as Example 1 a specific step-by-step operational sequence for fabricating a specific phenolic-furfural (PF) aerogel composition, with Examples 2–7, setting forth modifications of the Example 1 fabrication sequence utilizing different formulations, times, temperatures, etc. for producing PF aerogels with different characteristics.

EXAMPLE 1

Dissolve 10 g of a 50:50 phenolic-novolak/furfural resin solution (e.g. FurCarb UP 520) in 100 ml n-propanol. Add 1.0 g of a catalyst (e.g. Q2001) which generates HCl in-situ. Pour this solution into glass vials (molds), seal, and cure for 4 days at 85° C. Upon completion of the cure cycle, remove the cross-linked PF gels from the glass vials and place directly in a jacketed pressure vessel that is then filled with liquid $CO_2$ at ~10° C. The vessel should then be flushed repeatedly with fresh $CO_2$ so that the solvent (i.e., n-propanol) in the pores of the gel is completely replaced with liquid $CO_2$. The vessel is heated above the critical point of $CO_2$ ($T_c$=31° C.; $P_c$=7.4 MPa) and then slowly vented to atmospheric pressure. The resultant porous materials are PF aerogels. These materials are dark brown in color and have a density of ~0.13/cc.

EXAMPLE 2

Dissolve 10 g FurCarb UP520 plus 20 ml isopropanol plus 0.5 g Q2001 catalyst. Same processing procedure as in Example 1. Produces a PF aerogel with final density of 0.50 g/cc. Different solvents such as ethanol and methanol could be used, but cure temperature would have to be lower.

EXAMPLE 3

Dissolve 10 g FurCarb UP520 plus 75 ml n-propanol plus 0.5 g Q2001 catalyst plus 2 drops of black ink (i.e. colloidal carbon particles dispersed in a solvent). Process as in Example 1. Produces opacified PF aerogel with final density equals 0.16 g/cc. The carbon black additive imparts stronger IR absorption characteristics to the PF aerogel, thereby giving it a slightly lower thermal conductivity as compared to a non-opacified aerogel control sample.

EXAMPLE 4

Carry out process of Example 1 followed by pyrolysis for 4 hrs. at 1050° C. under nitrogen purge. Final carbon aerogel has a density of 0.31 g/cc, and is black in color.

EXAMPLE 5

Starting with a PF aerogel of 0.20 g/cc, place material (aerogel specimen) in a tube furnace and heat to 1050° C. at ~1° C./min. under $N_2$ purge. Upon reaching 1050° C. switch purge gas to $CO_2$ for three (3) hrs. to activate the carbon aerogel. The purge gas is then switched back to $N_2$ as the furnace cools back to room temperature. The activation process increases the surface area of the final carbon aerogel relative to a control sample pyrolyzed only in N2.

EXAMPLE 6

Add to the solution of Example 1, an additive selected from the group of high surface area powders (e.g. silica, carbon black, platinum black, nickel), metal salts, organometallics, and fibers for providing a doped PF aerogel.

EXAMPLE 7

Add to the solution of Example 1, a dopant selected from the group listed in Example 6, as well as platinum, zinc, and copper powders, and then pyrolyze at 600°–3000° C. to form a doped carbon aerogel.

It has thus been shown that the present invention provides a new type of organic aerogel; namely, phenolic-furfural (PF) aerogels, and methods for fabricating same. The new organic aerogels may be pyrolyzed to form new carbon aerogels that can be utilized in a wide variety of applications from packing materials to electrodes, thereby providing an advance in the organic aerogel and carbon aerogel field of technology. The new PF aerogels can be fabricated by a more simple process than the prior known processes for producing RF and MF aerogels.

While particular operational sequences, formulations, materials, process parameters, and end product densities and surface areas, etc. have been set forth to describe and exemplify the invention, such are not intended to be limiting. Modifications and changes may become apparent to those skilled in the art, and it is intended that the invention be limited only by the scope of the appended claims.

I claim:
1. A method for producing low density, organic aerogels of ultrafine pore size, comprising:
    mixing a predetermined ratio of phenolic-furfural in an organic solvent compatible with carbon dioxide;
    polymerizing in the presence of a catalyst;
    replacing the organic solvent with carbon dioxide; and
    supercritical drying from carbon dioxide.
2. The method of claim 1, additionally including preparation of the phenolic-furfural, the organic solvent, and the catalyst to have a formulation of about 10 g furfural-phenolic, about 20–100 ml organic solvent, and about 0.5–1.0 g acid catalyst.
3. The method of claim 2, wherein the organic solvent is 1-propanol.
4. The method of claim 2, wherein the catalyst is selected from the group of toluenesulfonic acid, phosphoric acid, and QUACORR 2001.
5. The method of claim 1, additionally including pyrolyzing the thus formed organic aerogel in an inert atmosphere selected from the group consisting of nitrogen, argon and helium to form a carbon aerogel having a density of 0.2 to 1.0 g/cc.
6. The method of claim 5, wherein the inert atmosphere is nitrogen, and pyrolyzing is carried out at a temperature of about 1050° C.
7. The method of claim 1, additionally adding colloidal carbon particles to the organic solvent.
8. The method of claim 7, wherein the colloidal carbon particles consists of drops of black ink.
9. The method of claim 5, additionally including switching the inert atmosphere to a atmosphere of $CO_2$ for a specified time period to activate the carbon aerogel, and then switching back to the inert atmosphere during cooling.
10. The method of claim 1, additionally including adding to the mixture an additive selected from the group consisting of high surface area powders, metal salts, organometallics, and fibers.
11. The method of claim 10, wherein the additive is platinum black.
12. The method of claim 11, additionally including pyrolyzing the thus formed aerogel to form a doped carbon aerogel.
13. The method of claim 1, additionally including adding to the mixture a dopant selected from powders of platinum, nickel, zinc or copper.
14. The method of claim 13, additionally including pyrolyzing the thus formed aerogel to form a doped carbon aerogel.

* * * * *